United States Patent
Jarre et al.

(10) Patent No.: US 11,526,532 B2
(45) Date of Patent: Dec. 13, 2022

(54) DYNAMIC DATA VIEWER

(71) Applicant: SAP SE, Walldorf (DE)

(72) Inventors: Soenke Jarre, Nussloch (DE); Carola Schoenfelder, Walldorf (DE)

(73) Assignee: SAP SE, Walldorf (DE)

( * ) Notice: Subject to any disclaimer, the term of this patent is extended or adjusted under 35 U.S.C. 154(b) by 479 days.

(21) Appl. No.: 15/709,188

(22) Filed: Sep. 19, 2017

(65) Prior Publication Data

US 2019/0087476 A1 Mar. 21, 2019

(51) Int. Cl.
| | |
|---|---|
| *G06F 16/26* | (2019.01) |
| *G06F 3/0481* | (2022.01) |
| *G06F 3/04842* | (2022.01) |
| *G06F 16/25* | (2019.01) |
| *G06F 16/22* | (2019.01) |
| *G06F 40/177* | (2020.01) |

(52) U.S. Cl.
CPC .......... *G06F 16/26* (2019.01); *G06F 3/0481* (2013.01); *G06F 3/04842* (2013.01); *G06F 16/2282* (2019.01); *G06F 16/252* (2019.01); *G06F 40/177* (2020.01)

(58) Field of Classification Search
None
See application file for complete search history.

(56) References Cited

U.S. PATENT DOCUMENTS

| | | | | |
|---|---|---|---|---|
| 5,255,356 | A * | 10/1993 | Michelman | G06F 40/18 715/217 |
| 6,167,396 | A * | 12/2000 | Lokken | G06F 16/283 707/737 |
| 7,360,175 | B2 * | 4/2008 | Gardner | G06F 3/0482 715/825 |
| 7,559,023 | B2 * | 7/2009 | Hays | G06F 40/177 715/255 |
| 7,707,490 | B2 * | 4/2010 | Hays | G06F 16/248 715/234 |
| 8,001,155 | B2 * | 8/2011 | Danton | G06F 16/26 707/797 |
| 8,010,909 | B1 * | 8/2011 | Hanson | G06F 16/26 715/853 |
| 8,060,817 | B2 * | 11/2011 | Goldberg | G06F 16/283 715/212 |
| 8,296,646 | B2 * | 10/2012 | Weitzman | G06F 40/18 715/212 |

(Continued)

Primary Examiner — Sherief Badawi
Assistant Examiner — Koorosh Nehchiri
(74) Attorney, Agent, or Firm — Mintz Levin Cohn Ferris Glovsky and Popeo, P.C.

(57) ABSTRACT

A method may include receiving, from a client, an indication that a first display level includes a first attribute from a first dimension of data and that a second display level includes a second attribute from the first dimension. The data may be stored at a database. A user interface may be generate for displaying at least a portion of the data at the client. The user interface may include a table having a first column corresponding to the first attribute. In response to the client requesting to change from the first display level to the second display level, the user interface may be updated by inserting, into the table, a second column corresponding to the second attribute. Related systems and articles of manufacture are also provided.

9 Claims, 13 Drawing Sheets

(56) References Cited

U.S. PATENT DOCUMENTS

| | | | |
|---|---|---|---|
| 8,312,366 B2* | 11/2012 | Folting | G06F 40/177 715/212 |
| 8,402,361 B2* | 3/2013 | Goldberg | G06F 40/177 715/212 |
| 2002/0143809 A1* | 10/2002 | Bennett | G06F 40/18 715/219 |
| 2003/0061225 A1* | 3/2003 | Bowman | G06F 16/10 |
| 2004/0237029 A1* | 11/2004 | Medicke | G06F 16/283 715/213 |
| 2005/0060300 A1* | 3/2005 | Stolte | G06F 16/26 |
| 2005/0060647 A1* | 3/2005 | Doan | G06F 16/248 715/205 |
| 2006/0101324 A1* | 5/2006 | Goldberg | G06F 17/245 715/227 |
| 2006/0107196 A1* | 5/2006 | Thanu | G06F 40/18 715/217 |
| 2006/0129598 A1* | 6/2006 | Anjur | G06F 16/283 |
| 2007/0050697 A1* | 3/2007 | Lewis-Bowen | G06F 40/18 715/212 |
| 2007/0203902 A1* | 8/2007 | Bauerte | G06Q 30/02 |
| 2008/0201296 A1* | 8/2008 | Yu | G06F 16/24554 |
| 2009/0013271 A1* | 1/2009 | Hellman | G06F 16/26 715/764 |
| 2009/0018996 A1* | 1/2009 | Hunt | G06F 16/2264 |
| 2009/0031208 A1* | 1/2009 | Robinson | G06F 40/177 715/227 |
| 2009/0049372 A1* | 2/2009 | Goldberg | G06F 17/245 715/227 |
| 2009/0319543 A1* | 12/2009 | Danton | G06F 16/26 |
| 2010/0131457 A1* | 5/2010 | Heimendinger | G06F 16/283 707/602 |
| 2011/0191303 A1* | 8/2011 | Kaufman | G06F 16/20 707/684 |
| 2012/0166486 A1* | 6/2012 | Visser | G06F 17/246 |
| 2013/0086459 A1* | 4/2013 | Foiling | G06F 17/246 715/212 |
| 2013/0246484 A1* | 9/2013 | Stolte | G06F 16/211 707/807 |
| 2014/0101591 A1* | 4/2014 | Hellman | G06Q 10/10 715/771 |
| 2015/0154248 A1* | 6/2015 | Deng | G06F 3/0482 707/736 |
| 2017/0293664 A1* | 10/2017 | Duffy | G06F 16/287 |

* cited by examiner

DYNAMIC DATA VIEWER

TECHNICAL FIELD

The subject matter described herein relates generally to database processing and more specifically to displaying data from a database.

BACKGROUND

A database may be configured to store an organized collection of data. The database may be coupled with a database management system (DBMS) that supports a variety of operations for accessing, managing, and/or updating the data held in the database. For example, at least some of the data in the database may be retrieved by executing a database query such as, for example, a structured query language (SQL) SELECT.

SUMMARY

Systems, methods, and articles of manufacture, including computer program products, are provided for merging multiproviders. In one aspect, there is provided a system. The system may include at least one data processor and at least one memory. The at least one memory may store instructions that result in operations when executed by the at least one data processor. The operations may include: receiving, from a client, an indication that a first display level includes a first attribute from a first dimension of data and that a second display level includes a second attribute from the first dimension of the data, the data being stored at a database; generating a user interface for displaying at least a portion of the data at the client, the user interface including a table having a first column corresponding to the first attribute; and in response to the client requesting to change from the first display level to the second display level, updating the user interface by at least inserting, into the table, a second column corresponding to the second attribute.

In some variations, one or more features disclosed herein including the following features can optionally be included in any feasible combination. The first dimension may include a plurality of differentiation criteria for differentiating a first data entry from a second data entry. The first attribute may be a first differentiation criterion and the second attribute may be a second differentiation criterion.

In some variations, the first dimension may include a plurality of keyfigures generated by applying an aggregation function to one or more data entries. The first attribute may be a first keyfigure and the second attribute may be a second keyfigure. The indication may further assign, to the first display level, a third attribute from a second dimension of data. The second dimension of data may include a time dimension. The third attribute may be a timespan covered by the one or more data entries used to generate the plurality of keyfigures. The table may include at least one column and/or at least one row corresponding to the third attribute.

In some variations, the user interface may be further updated by inserting, into the table, one or more rows corresponding to the second attribute.

In some variations, one or more database queries may be executed to retrieve, from the database, at least a portion of the data. In response to the client requesting to change from the second display level to the first display level, the user interface may be updated by at least removing, from the table, the second column corresponding to the second attribute. A request to change from the first display level to the second display level may be received from the client. The request may include a selection of the first dimension of data. The selection may further include a specific row of data from the table.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A user may retrieve data from a database by executing one or more database queries (e.g., SQL SELECT). The retrieved data may be presented to the user in a graphic display such as, for example, a graphical user interface (GUI). However, when a database query returns a large quantity of data, it may be impractical to present all of the data in the graphic display simultaneously. Furthermore, the user may find it cumbersome to interact with a profusion of data. As such, in some example embodiments, a record viewer may be configured to dynamically adjust the selection of data presented in a graphic display.

Figure 1:
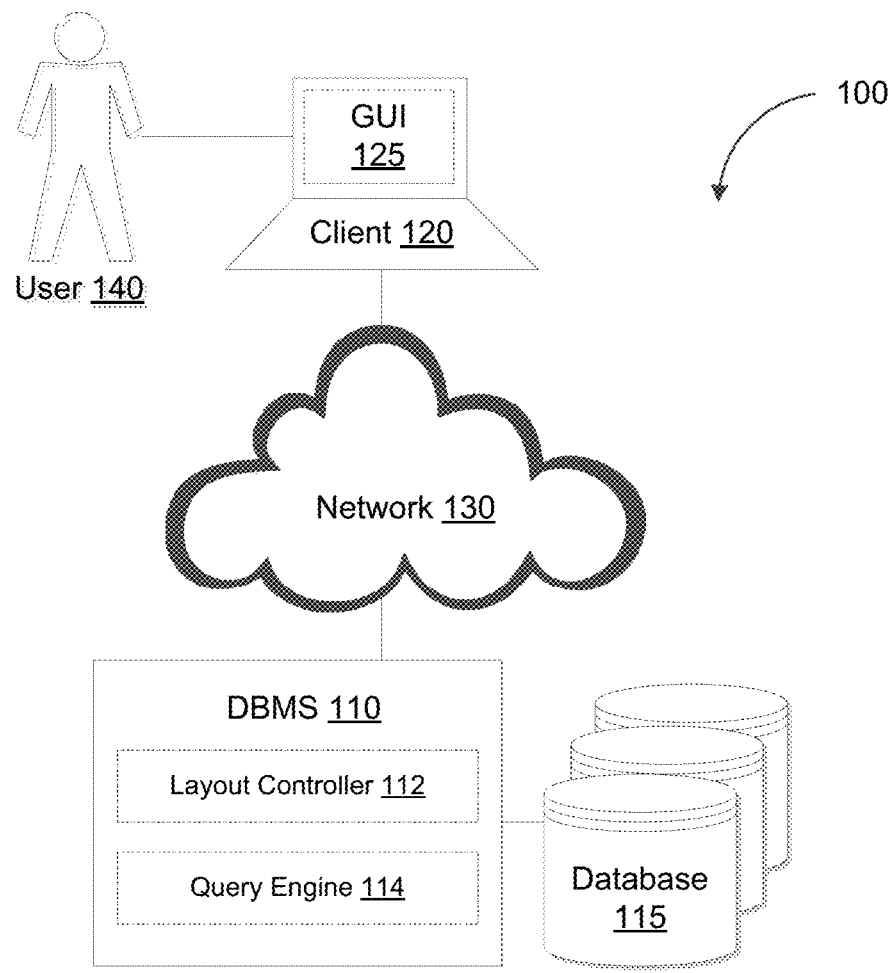
FIG. 1 depicts a system diagram illustrating a database system, in accordance with some example embodiments.

FIG. 1 depicts a system diagram illustrating a database system 100, in accordance with some example embodiments. Referring to FIG. 1, the database system 100 may include a database management system 110. The database management system 110 may include a layout controller 112 and a query engine 114. Furthermore, the database management system 110 may be coupled with a database 115, which may be any type of database including, for example, an in-memory database, a relational database, a non-SQL (NoSQL) database, and/or the like.

As shown in FIG. 1, the database management system 110 may be communicatively coupled with a client 120 via a network 130. The network 130 may be a wired and/or wireless network including, for example, a wide area network (WAN), a local area network (LAN), a public land mobile network (PLMN), the Internet, and/or the like. The client 120 may send, to the database management system 110, one or more database queries (e.g., SQL SELECT) for retrieving data from the database 115. The query engine 116 may execute the database queries by at least retrieving the requested data from the database 115. Meanwhile, the layout controller 114 may generate a graphic display, for example a graphic user interface 125, for presenting the retrieved data at the client 120.

The data stored in the database 115 may be associated with one or more dimensions including, for example, a differentiation criteria dimension, a time dimension, a keyfigure dimension, and/or the like. Each dimension may further be associated with one or more attributes. For example, the differentiation criteria dimension may include one or more differentiation criteria such as, for example, "company code," "risk-free currency," "currency," "portfolio," and/or the like. As used herein, a differentiation criterion may be a characteristic, feature, or trait that is associated with at least one data entry that differentiates that data entry from at least one other data entry. The keyfigure dimension may include different keyfigures including, for example, "hedged rate," "net open exposure," "net hedges," "net exposure," and/or the like. A keyfigure may be a value that is generated by applying, to one or more entries of data, an aggregation function such as, for example, average, count, maximum, median, minimum, mode, sum, and/or the like. Meanwhile, the time dimension may include one or more timespans including, for example, quarterly (e.g., "periods"), yearly (e.g., "total of year"), inception to date (e.g., "total"), and/or the like. It should be appreciated that one or more keyfigures may be calculated for data entries that span periods of time corresponding to one or more of the timespans included in the time dimension. For example, a keyfigure, such as the "hedged rate" keyfigure, may be determined for a period of time spanning one or more years, one or more quarters of the year, from inception to date, and/or the like.

In some example embodiments, a user 140 may configure and/or adjust, via the client 120, the selection of data that is presented in the graphic user interface 125. For example, the selection of data that is presented in the graphic user interface 125 may correspond to one or more display levels. The client 120 may specify the data that is included at each display level by specifying the attributes that are included in each display level. Furthermore, the user 140 may dynamically adjust the selection of data that is presented in the graphic user interface 125 by at least altering a current display level.

The layout controller 114 may apply the configurations and/or adjustments from the user 140 when generating the graphic user interface 125. For example, the graphic user interface 125 displaying data from a first display level may be expanded to display one or more attributes from a second display level. Alternatively and/or additionally, the graphic user interface 125 displaying attributes from both the first display level and the second display level may be collapsed in order to display only attributes from the first display level. It should be appreciated that the graphic user interface 125 may display the selection of data in a table having columns and/or rows that correspond to the attributes associated with the data. As such, altering the display level may cause the addition and/or removal of one or more columns and/or rows from the table shown in the graphic user interface 125.

Figure 2A:
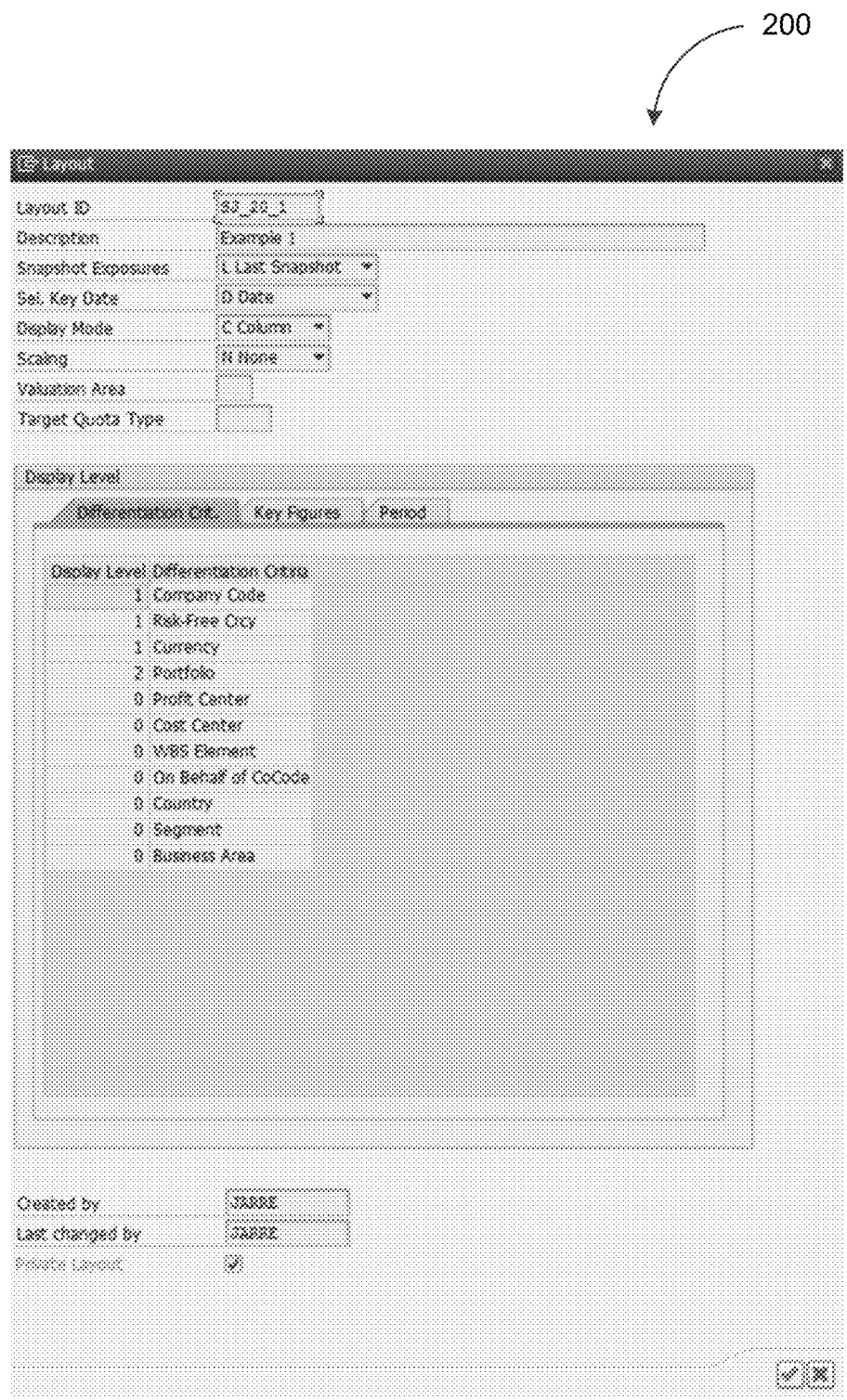
FIG. 2A depicts a user interface for layout configuration, in accordance with some example embodiments.

To further illustrate, FIG. 2A depicts a user interface 200 for layout configuration, in accordance with some example embodiments. Referring to FIG. 2A, the layout controller 112 may generate the user interface 200 for display at the client 120. Meanwhile, the user 140 may input, via the user interface 200, the one or more differentiation criteria from the differentiation criteria dimension that are to be included in each display level. For example, as shown in FIG. 2A, the user 140 may assign, via the user interface 200, the differentiation criteria "company code," "risk-free currency," and "currency" to a first display level (e.g., level "1"), and the differentiation criterion "portfolio" to a second display level (e.g., level "2". Other differentiation criteria such as, for example, "profit center," "cost center," "WBS element," "on behalf of company code," "country," "segment," "business area," and/or the like may not be assigned to any display level (e.g., level "0" and may thus be excluded from being displayed.

Figure 2B:
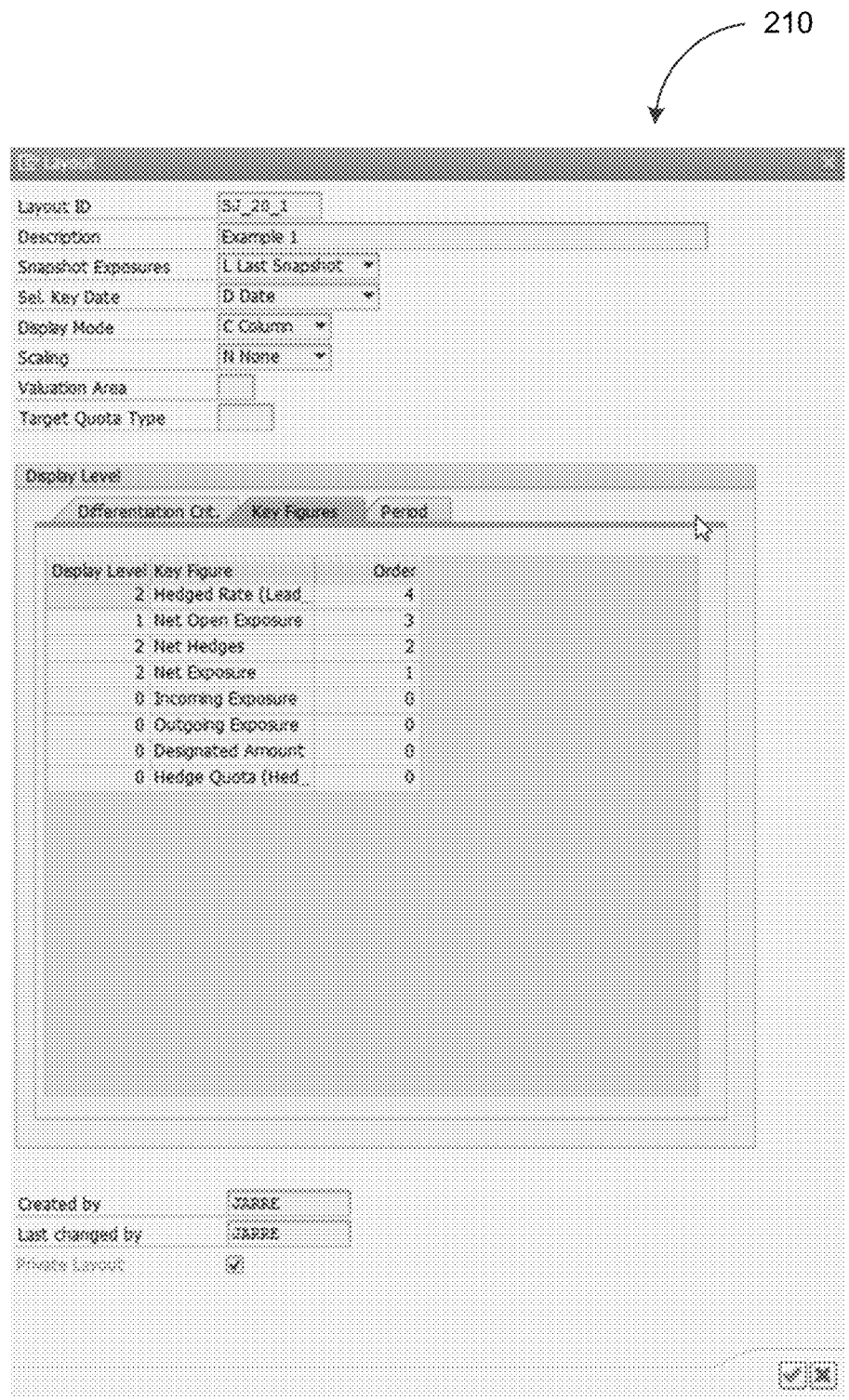
FIG. 2B depicts a user interface for layout configuration, in accordance with some example embodiments.

FIG. 2B depicts a user interface 210 for layout configuration, in accordance with some example embodiments. Referring to FIG. 2B, the layout controller 112 may generate the user interface 210 for display at the client 120. Meanwhile, the user 140 may input, via the user interface 210, the one or more keyfigures from the keyfigure dimension that are to be included in each display level. For example, as shown in FIG. 2B, the user 140 may assign, via the user interface 210, the keyfigure "net open exposure" to the first display level (e.g., level "1") and the keyfigures "hedged read," "net hedges," and "net exposure" to the second display level (e.g., level "2". Other keyfigures such as, for example, "incoming exposure," "outgoing exposure," "designated amount," "hedge quota," and/or the like may not be assigned to any display level (e.g., level "0" and may thus be excluded from being displayed.

Figure 2C:
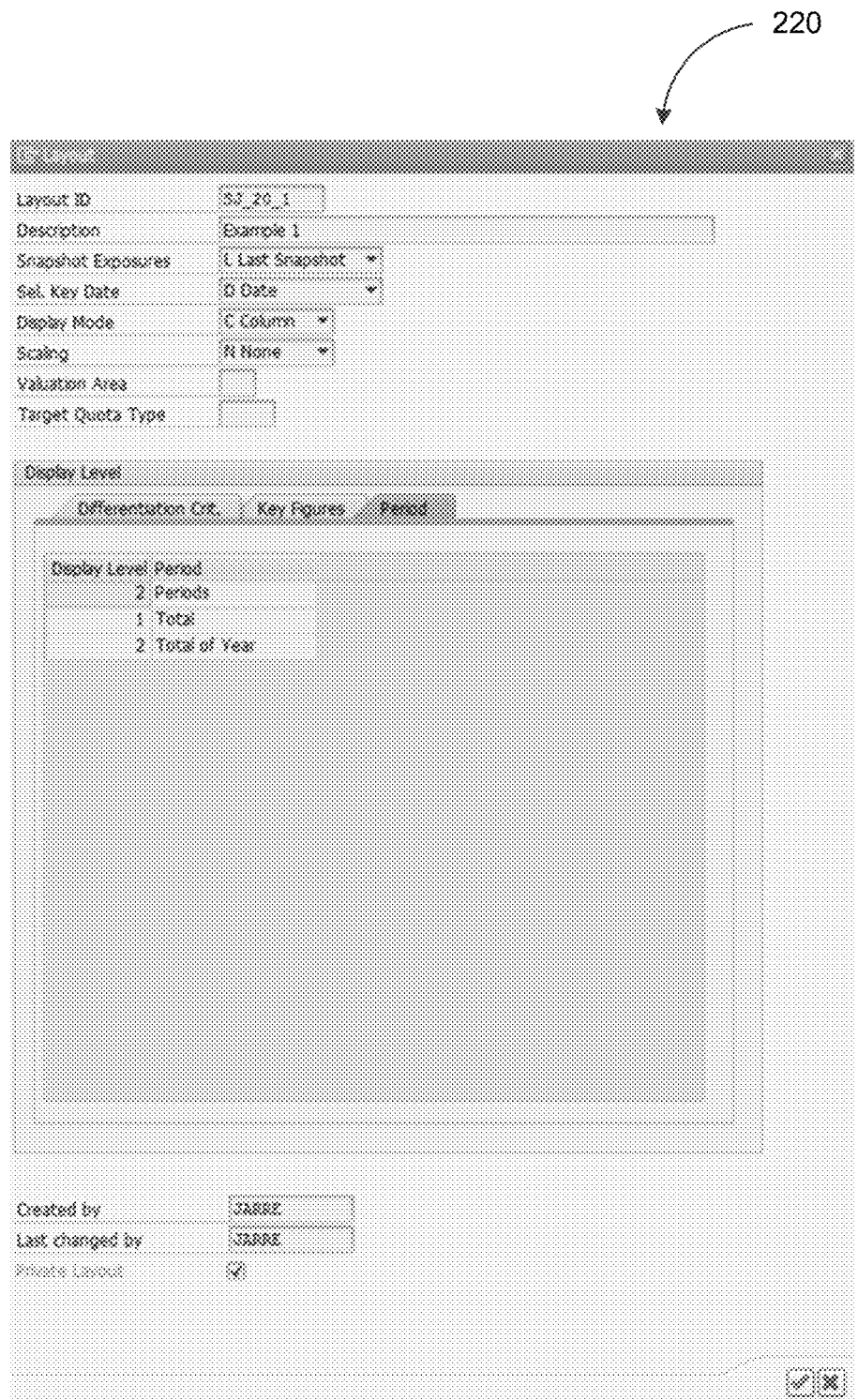
FIG. 2C depicts a user interface for layout configuration, in accordance with some example embodiments.

FIG. 2C depicts a user interface 220 for layout configuration, in accordance with some example embodiments. Referring to FIG. 2C, the layout controller 112 may generate the user interface 220 for display at the client 120. The user 140 may specify, via the user interface 220, the one or more timespans from the time dimension that are to be included in each display level. For example, as shown in FIG. 2C, the user 140 may specify, via the user interface 220, that the timespan from inception to date (e.g., "total") is part of the first display level (e.g., level "1"). As such, the values of the keyfigures that are shown in the first display level may be determined based on data entries that span from inception to date. Meanwhile, while the yearly timespan (e.g., "total of year") and the quarterly timespan (e.g., "periods") are part of the second display level (e.g., level "2". Accordingly, the values of the keyfigures that are shown in the second display level may be determined based on data entries that span one or more individual years and/or individual quarters of the year. Although not shown in FIG. 2C, one or more time units may also be excluded from being displayed by not being associated with any display level (e.g., level "0".

As noted, in addition to configuring the attributes that are included in each display level, the user 140 may adjust the selection of data that is being presented simultaneously in a graphic display by at least altering the current display level. For example, in some example embodiments, the user 140 may adjust the selection of data that is presented in a graphic display by altering the current display level with respect to one or more individual dimensions. The adjustments may be made with respect to all entries of data included in the display and/or one or more specific entries of data. In response to these adjustments, the layout controller 112 may expand and/or contract the graphic display to add and/or remove attributes associated with one or more dimensions.

Figure 3A:
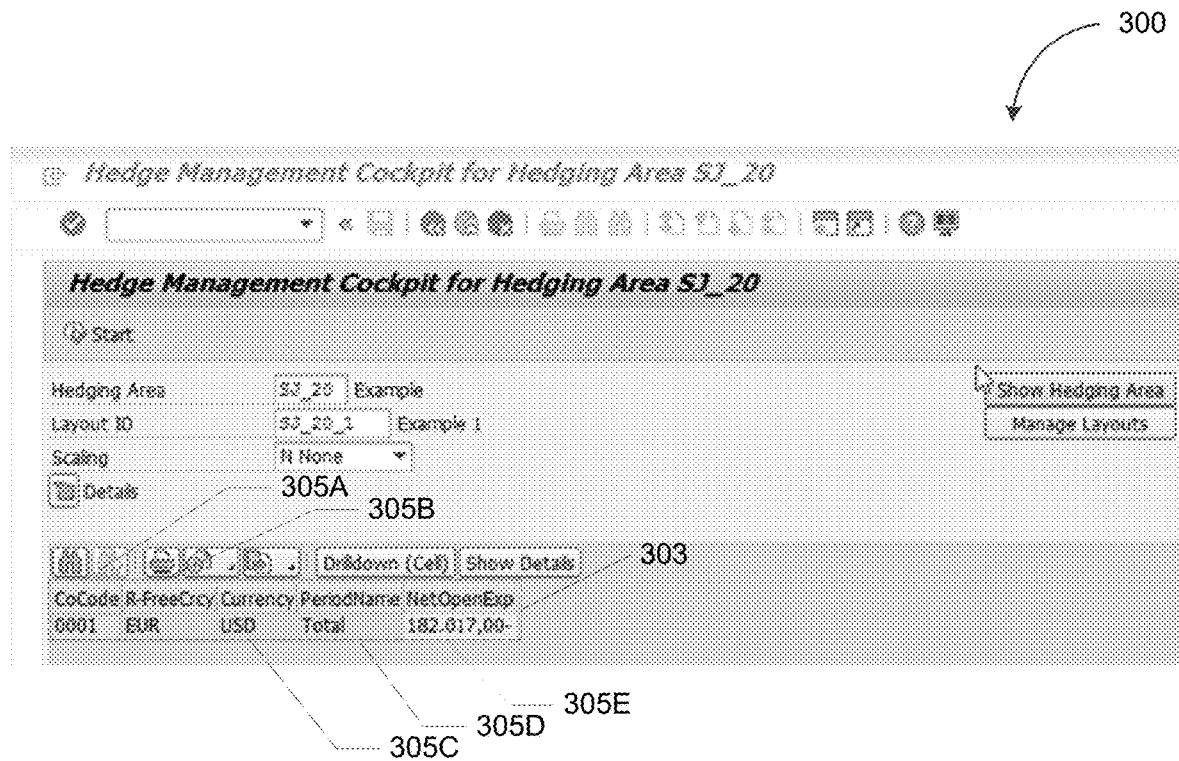
FIG. 3A depicts a user interface for displaying data, in accordance with some example embodiments.

To further illustrate, FIG. 3A depicts a user interface 300 for displaying data, in accordance with some example embodiments. Referring to FIG. 3A, the user interface 300 may display a selection of data that corresponds to attributes assigned to the first display level. In some example embodiments, the layout controller 112 may generate the user interface 300 when the user 140 selects the first display level (e.g., level "1"). For example, the user interface 300 may display a table 303 having a first column 305A corresponding to the differentiation criterion "company code," a second column 305B corresponding to the differentiation criterion "risk free currency," and a third column 305C corresponding to the differentiation criterion "currency." As noted, these differentiation criteria have been designated as part of the first display level. The table 303 may further include a fourth column 305D corresponding to the keyfigure "net open exposure," which has also been designated as part of the first display level. It should be appreciated that the values of the keyfigure "net open exposure" included in the fourth column 305D may be determined based on all data entries to date because the timespan inception to date (e.g., "total") was assigned to the first display level. Here, the table 303 may include a fifth column 305E corresponding to the names of the timespans (e.g., "total") included in the table 303.

Figure 3B:
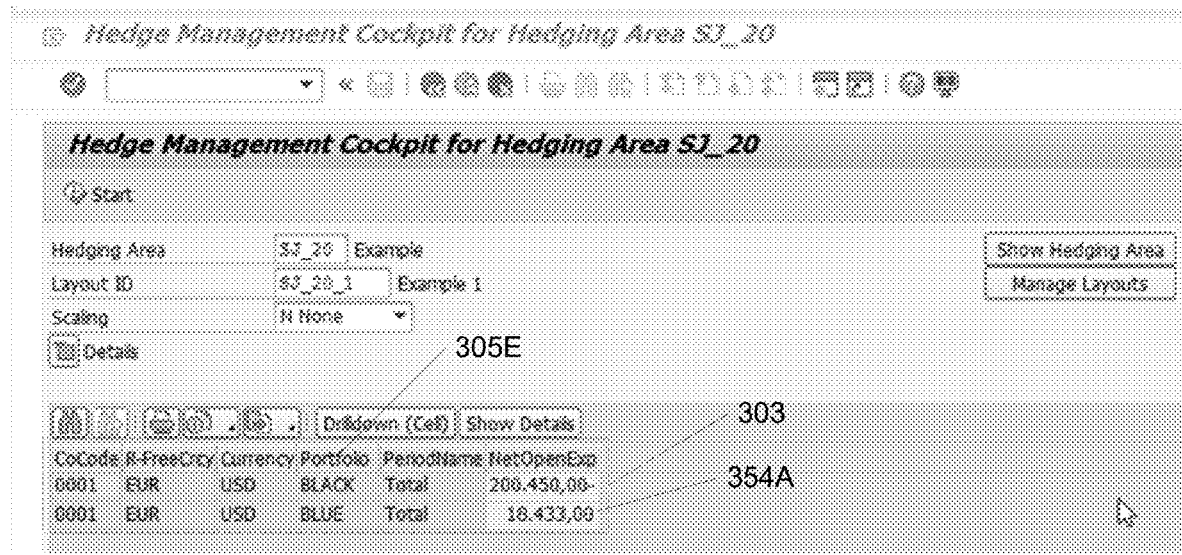
FIG. 3B depicts a user interface for displaying data, in accordance with some example embodiments.

FIG. 3B depicts a user interface 310 for displaying data, in accordance with some example embodiments. The layout controller 112 may generate the user interface 310 in response to the user 140 expanding the differentiation criteria dimension from the first display level to the second display level. For instance, the layout controller 112 may generate the user interface 310 by at least inserting, into the table 303, one or more columns and/or rows in order to accommodate data corresponding to the differentiation criteria from the second display level. Here, the user 140 did not specify any particular data entry. As such, the user interface 310 may include the additional differentiation criterion "portfolio" for every data entry instead of one or more specific data entries. Referring again to FIG. 3B, the layout controller 112 may into the table 303, a sixth column 305E and a first row 354A in order to accommodate data corresponding to the differentiation criterion "portfolio."

Figure 3C:
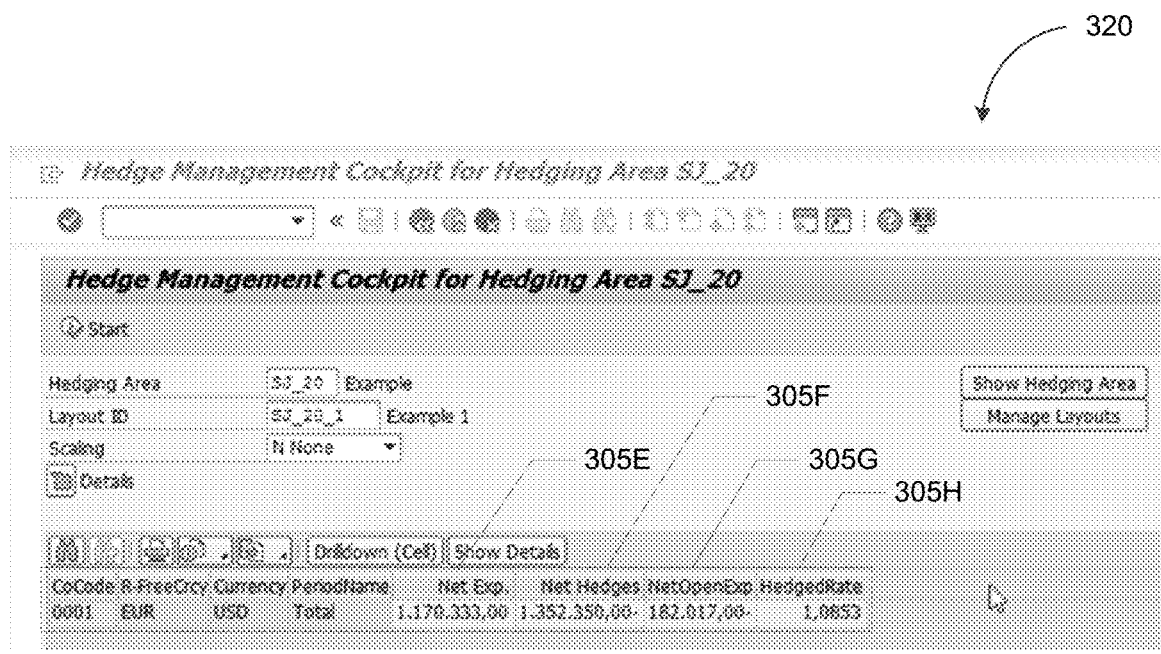
FIG. 3C depicts a user interface for displaying data, in accordance with some example embodiments.

FIG. 3C depicts a user interface 320 for displaying data, in accordance with some example embodiments. The layout controller 112 may generate the user interface 320 in response to the user 140 expanding the keyfigure dimension from the first display level to the second display level. For example, the layout controller 112 may generate the user interface 320 by at least inserting, into the table 303, one or more additional columns corresponding to the keyfigures from the second display level. Because the user 140 did not specify any particular data entry, the user interface 310 may include the additional keyfigures for every data entry. For instance, as shown in FIG. 3C, the table 303 may include the fifth column 305E corresponding to the keyfigure "net exposure" from the first display level. Furthermore, the table 303 may include a sixth column 305F corresponding to the keyfigure "net hedges," a seventh column 305G corresponding to the keyfigure "net open exposure," and a ninth column 305H corresponding to the keyfigure "hedge rate." As noted, the keyfigures "net hedges," "net open exposure," and "hedge rate" may have been assigned to the second display level.

Figure 3D:
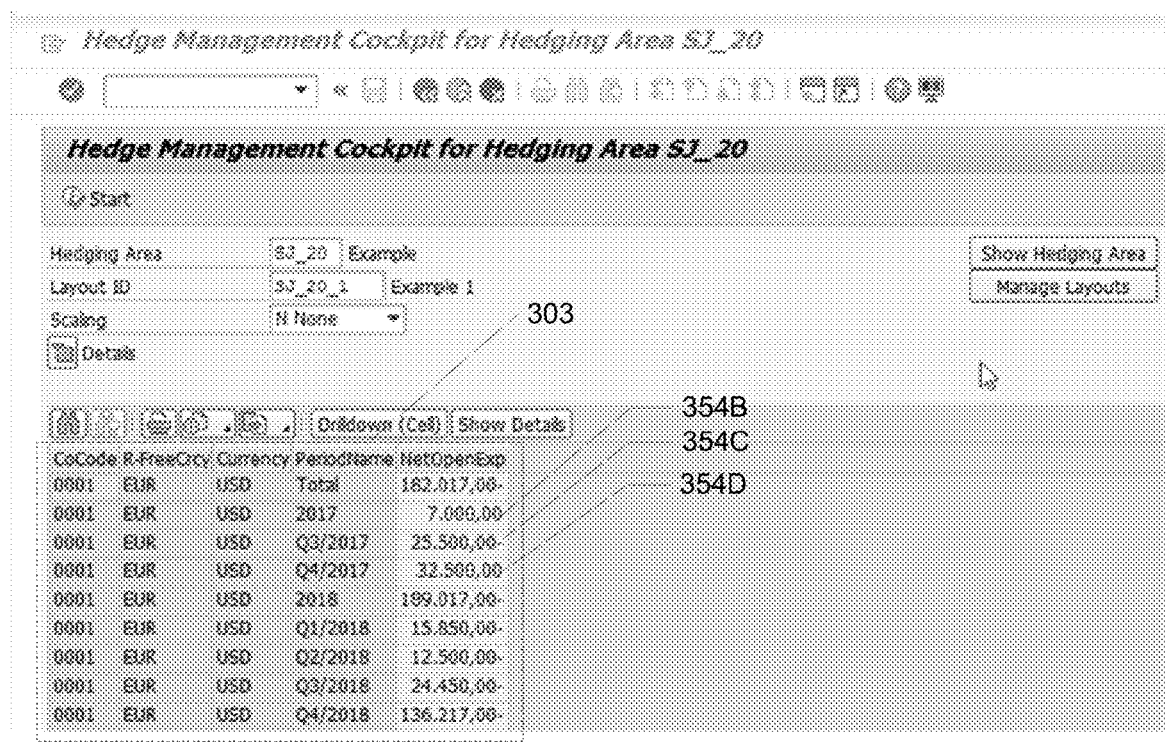
FIG. 3D depicts a user interface for displaying data, in accordance with some example embodiments.

FIG. 3D depicts a user interface 330 for displaying data, in accordance with some example embodiments. The layout controller 112 may generate the user interface 320 in response to the user 140 expanding the time dimension from the first display level to the second display level. Referring to FIG. 3D, when the user 140 does not specify any particular data entry, the layout controller 112 may generate the user interface 330 to include timespans from the second display level for all data entries. For example, the layout controller 112 may generate the user interface 330 by at least inserting, into the table 303, one or more additional rows corresponding to the timespans from the second display level. As shown in FIG. 3D, the table 303 may include a second row 354B corresponding to the timespan inception to date (e.g., "total") from the first display level. Furthermore, the table 303 may include a third row 354C corresponding to the yearly timespan (e.g., "total of year") and a fourth row 354D corresponding to the quarterly timespans (e.g., "periods"). Both the yearly timespan and the quarterly timespan may have been assigned to the second display level.

Figure 3E:
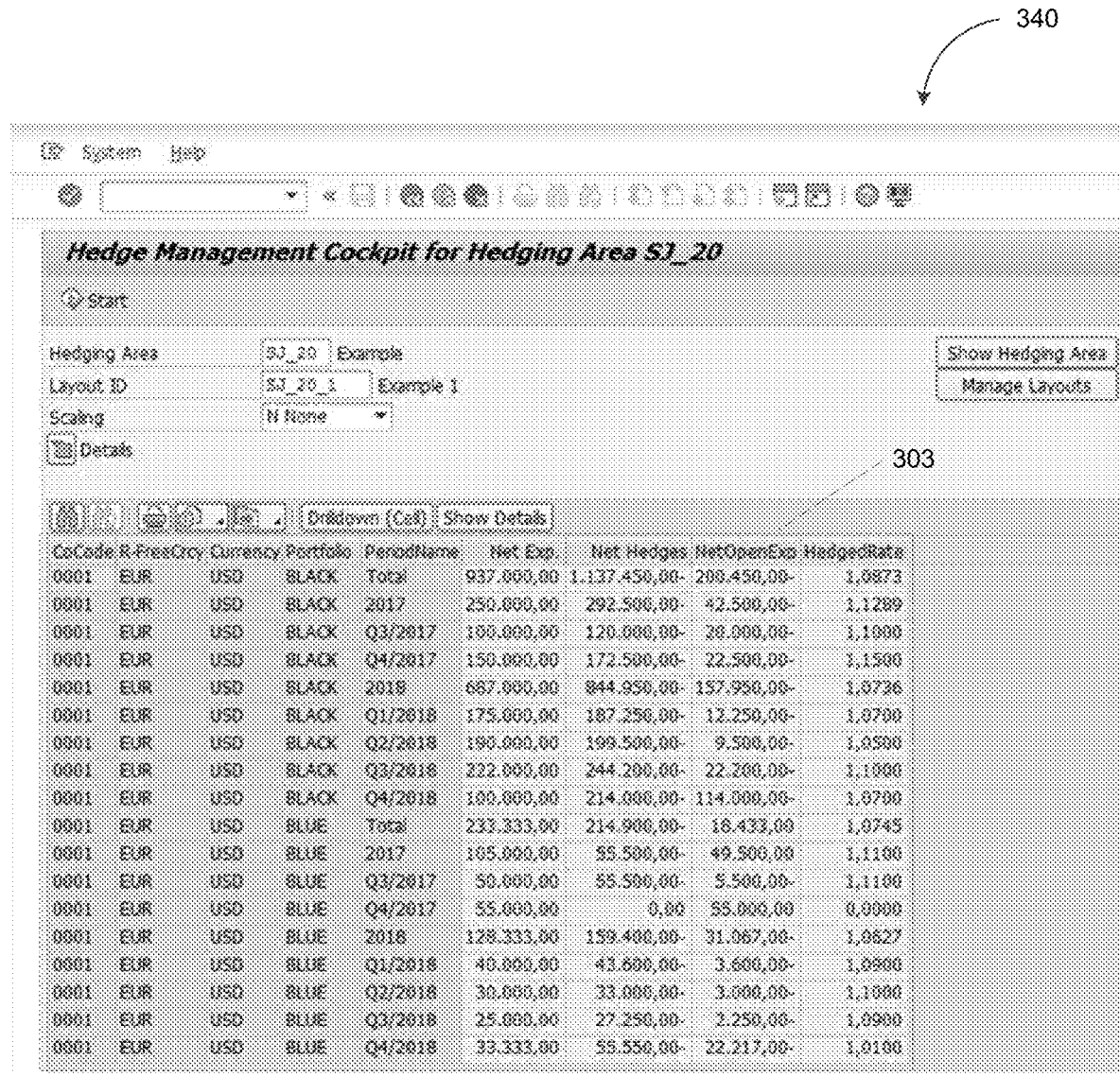
FIG. 3E depicts a user interface for displaying data, in accordance with some example embodiments.

FIG. 3E depicts a user interface 340 for displaying data, in accordance with some example embodiments. The layout controller 120 may generate the user interface 340 in response to the user 140 expanding the differentiation criteria dimension, the keyfigure dimension, and the time dimension from the first display level to the second display level. For example, the layout controller 112 may generate the user interface 340 by at least inserting, into the table 303, one or more additional rows and/or columns to accommodate the differentiation criteria, the keyfigures, and/or the timespans from the second display level. Referring to FIG. 3D, when the user 140 does not specify any particular data entry, the layout controller 112 may generate the user interface 340 to include differentiation criteria, keyfigures, and timespans from the second display level for all data entries. For example, as shown in FIG. 3D, the table 303 may include columns corresponding to the differentiation criteria "company code," "risk free currency," and "currency" from the first display level as well as a column corresponding to additional differentiation criterion "portfolio" from the second display level. The table 303 may further include columns corresponding to the keyfigure "net exposure" from the first display level and the keyfigures "net hedges," "net open exposure," and "hedge rate" from the second display level. Furthermore, the table 303 may include one or more rows corresponding to the timespan inception to date (e.g., "total") from the first display level as well as the yearly timespan (e.g., "total of year") and the quarterly timespans (e.g., "periods") from the second display level.

Figure 3F:
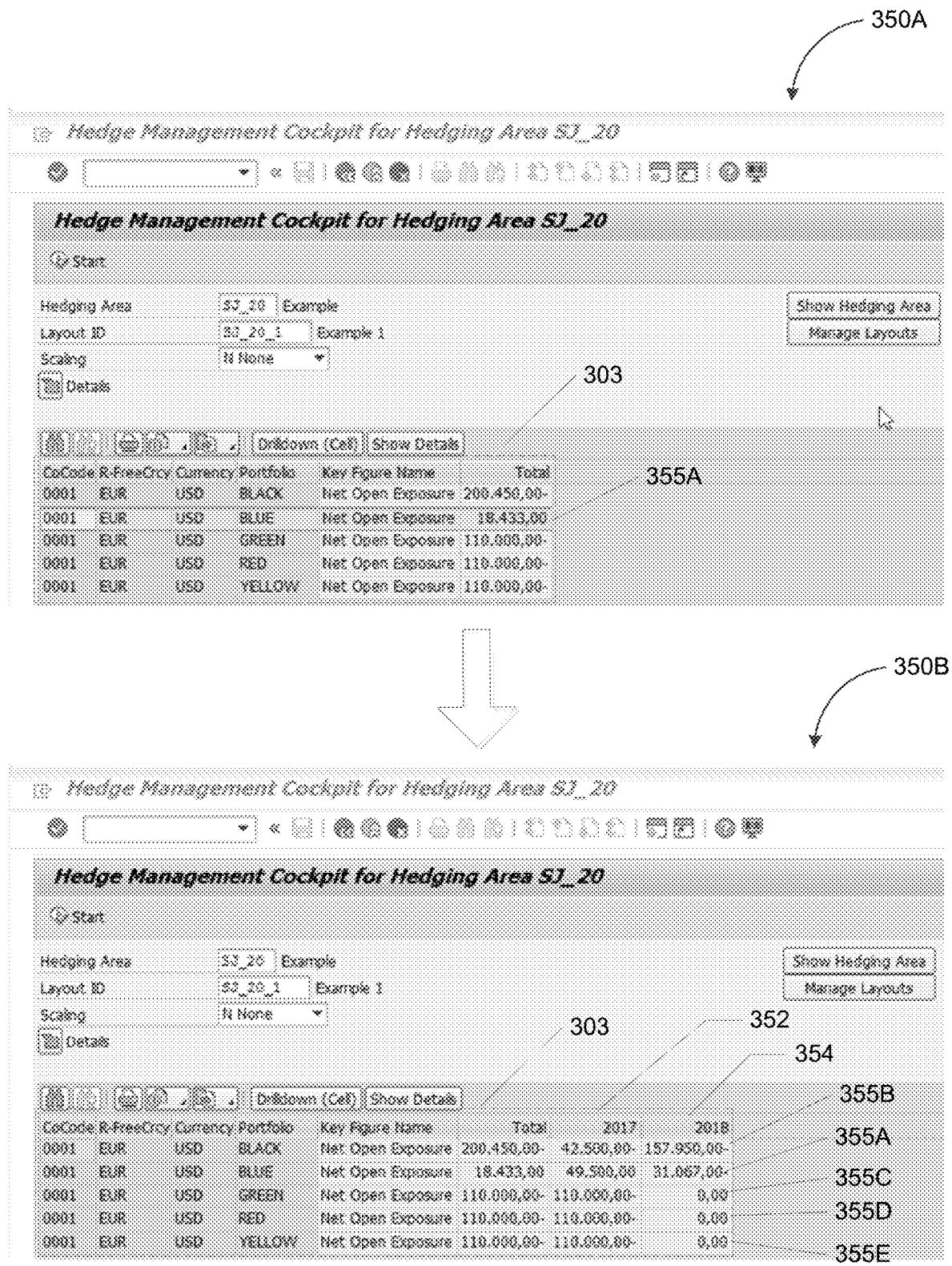
FIG. 3F depicts a first user interface and a second user interface for displaying data, in accordance with some example embodiments.

FIG. 3F depicts a first user interface 350A and a second user interface 350B for displaying data, in accordance with some example embodiments. In some example embodiments, the user 140 may adjust the display level with respect to one or more specific data entries. Referring to FIG. 3F, the first user interface 350A may display the inception to date timespan (e.g., "total") from the first display level. The user 140 may subsequently expand the time dimension of one or more specific data entries such as, for example, a first row 355A from the table 303 shown in the first user interface 350A. For instance, as shown in FIG. 3F, the user 140 may select the first row 355A by at least highlighting the first row 355A in the table 303. In response to the selection of the first row 355A, the layout controller 112 may generate the second user interface 350B, which may display the table 303 having one or more additional columns corresponding to the timespans (e.g., "total of year") from the second display level. For example, the table 303 may include a first column 352, which may contain values for the keyfigure "net open exposure" for the year "2017." Alternatively and/or additionally, the table 303 may include a second column 354, which may contain values for the keyfigure "net open exposure" for the year "2018." It should be appreciated that in addition to keyfigure values for the first row 355A, these additional columns (e.g., the first column 352 and/or the second column 354) may include keyfigure values for other data entries as well including, for example, a second row 355B, a third row 355C, a fourth row 355D, and/or a fifth row 355E.

Figure 3G:
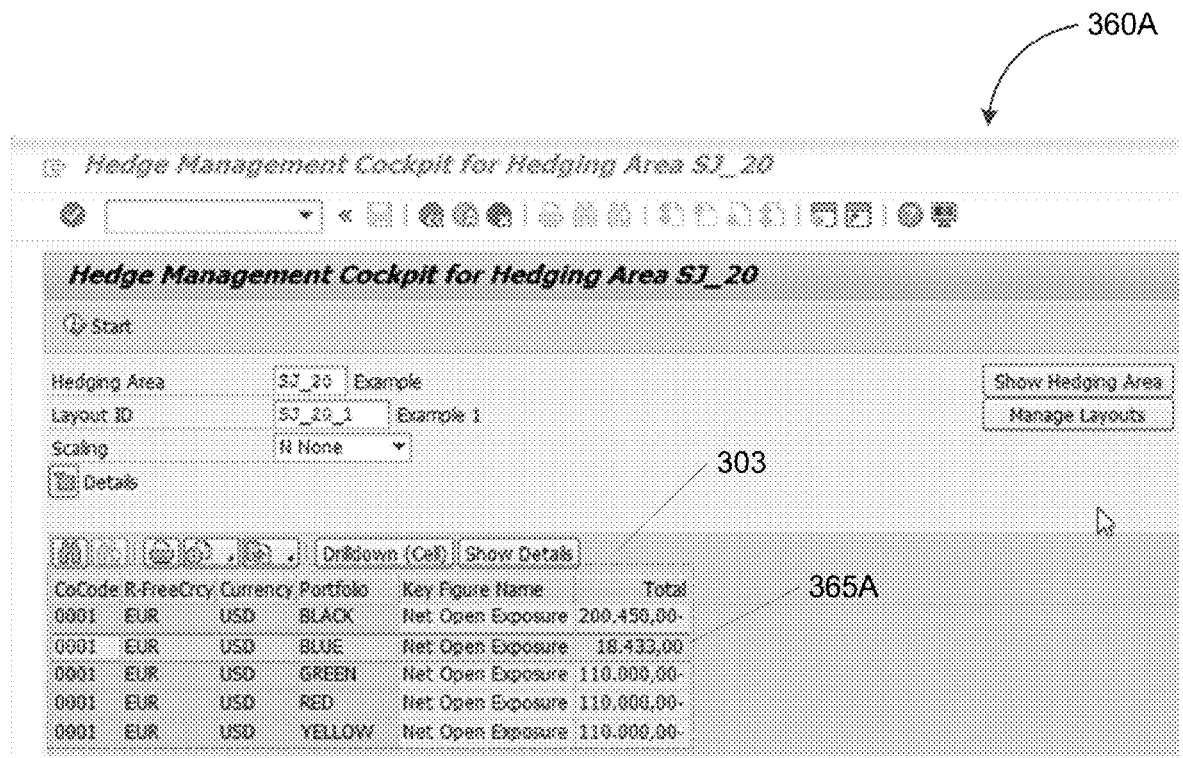
FIG. 3G depicts a first user interface and a second user interface for displaying data, in accordance with some example embodiments.
Figure 3G:
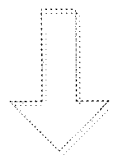
Figure 3G:
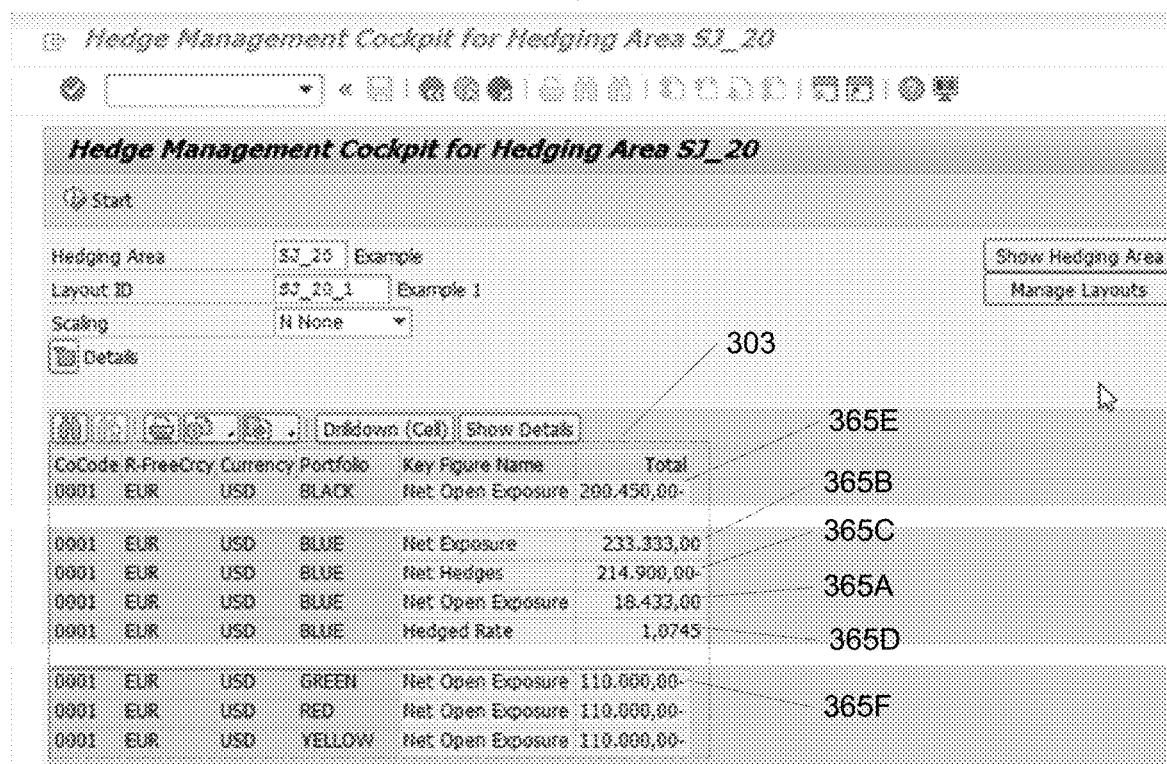

FIG. 3G depicts a first user interface 360A and a second user interface 360B for displaying data, in accordance with some example embodiments. As noted, in some example embodiments, the user 140 may adjust the display level with respect to one or more specific data entries. Referring to FIG. 3G, the first user interface 360A may display the "net open exposure" keyfigure from the first display level. The user 140 may expand the keyfigure dimension of one or more specific data entries such as, for example, a first row 365A from the table 303 shown in the first user interface 360A. For instance, as shown in FIG. 3G, the user 140 may select the first row 365A by at least highlighting the first row 365A in the table 303. In response to the selection of the first row 365A, the layout controller 112 may generate the second user interface 360B, which shows the table 303 having one or more additional rows corresponding to the keyfigures from the second display level. For example, the table 303 may include a second row 365B containing the keyfigure "net exposure," a third row 365C containing the keyfigure "net hedges," and/or a fourth row 365D containing the keyfigure "hedged rate." It should be appreciated that these additional rows may include only additional keyfigure values for the first row 365A but not any of the other data entries including, for example, a fifth row 365E and/or a sixth row 365F.

In some example embodiments, the user 140 may further configure and/or adjust, via the client 120, the selection of data that is presented in a graphic display by designating column-oriented and/or a row-oriented display for each dimension including, for example, the differentiation criteria dimension, the keyfigure dimension, and/or the time dimension. When a dimension is designated for a column-oriented display, the individual attributes included in dimension are shown as separate columns in a resulting graphic display. Alternatively and/or additionally, where a dimension is designated for a row-oriented display, the individual attributes included in the dimension are shown as separate rows in the resulting graphic display.

Figure 3H:
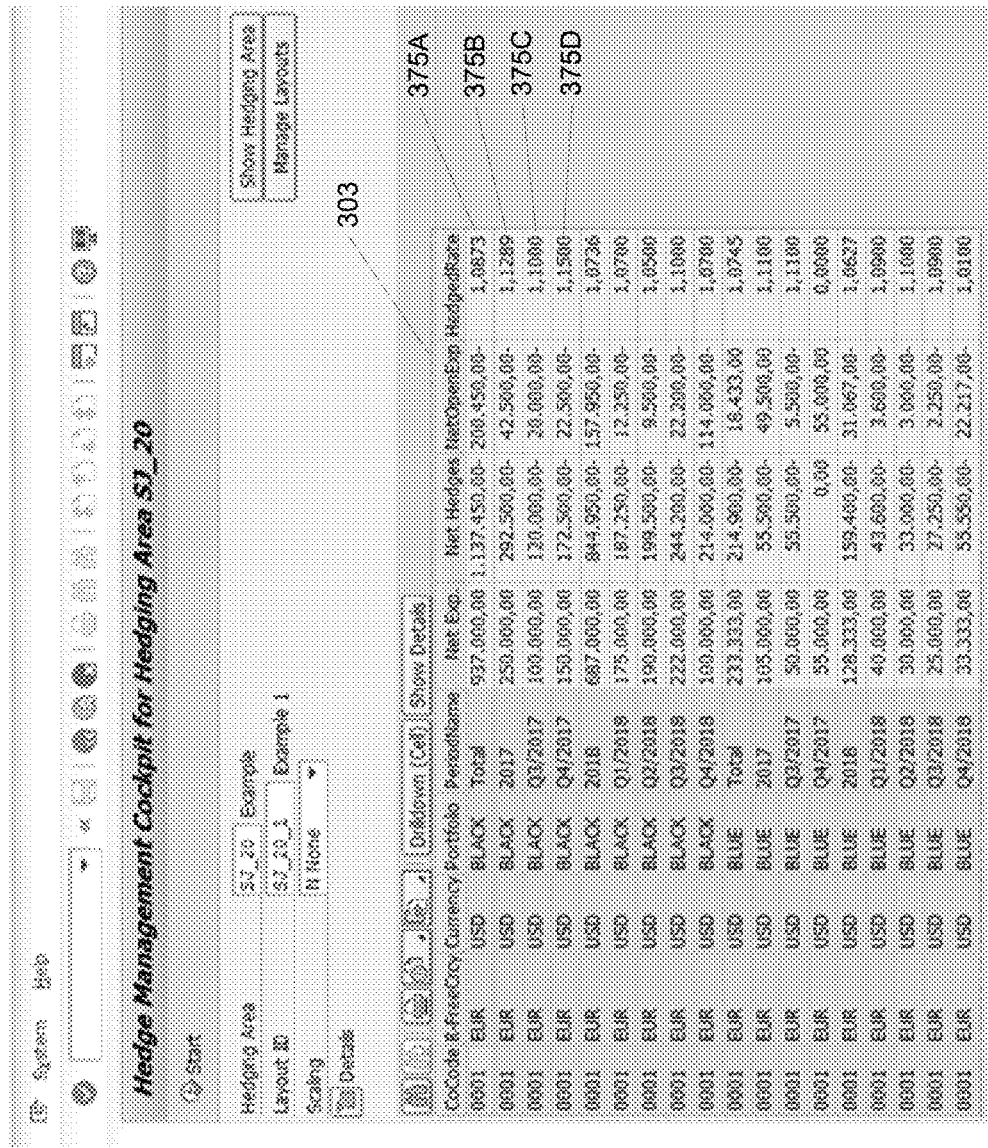
FIG. 3H depicts a user interface for displaying data, in accordance with some example embodiments.

To further illustrate, FIG. 3H depicts a user interface 370 for displaying data, in accordance with some example embodiments. In some example embodiments, the user 140 may designate the time dimension for a row-oriented display. Accordingly, as shown in FIG. 3H, the user interface 370 show the table 303 in which individual rows correspond to the different timespans included in the time dimension. For example, a first row 375A may correspond to the inception to date (e.g., "total") timespan from the first display level. A second row 375B may correspond to the yearly timespan (e.g., "total of year") from the second display level. Furthermore, a third row 375C and a fourth row 375D may both correspond to the quarterly timespan (e.g., "periods") from the second display level.

Figure 3I:
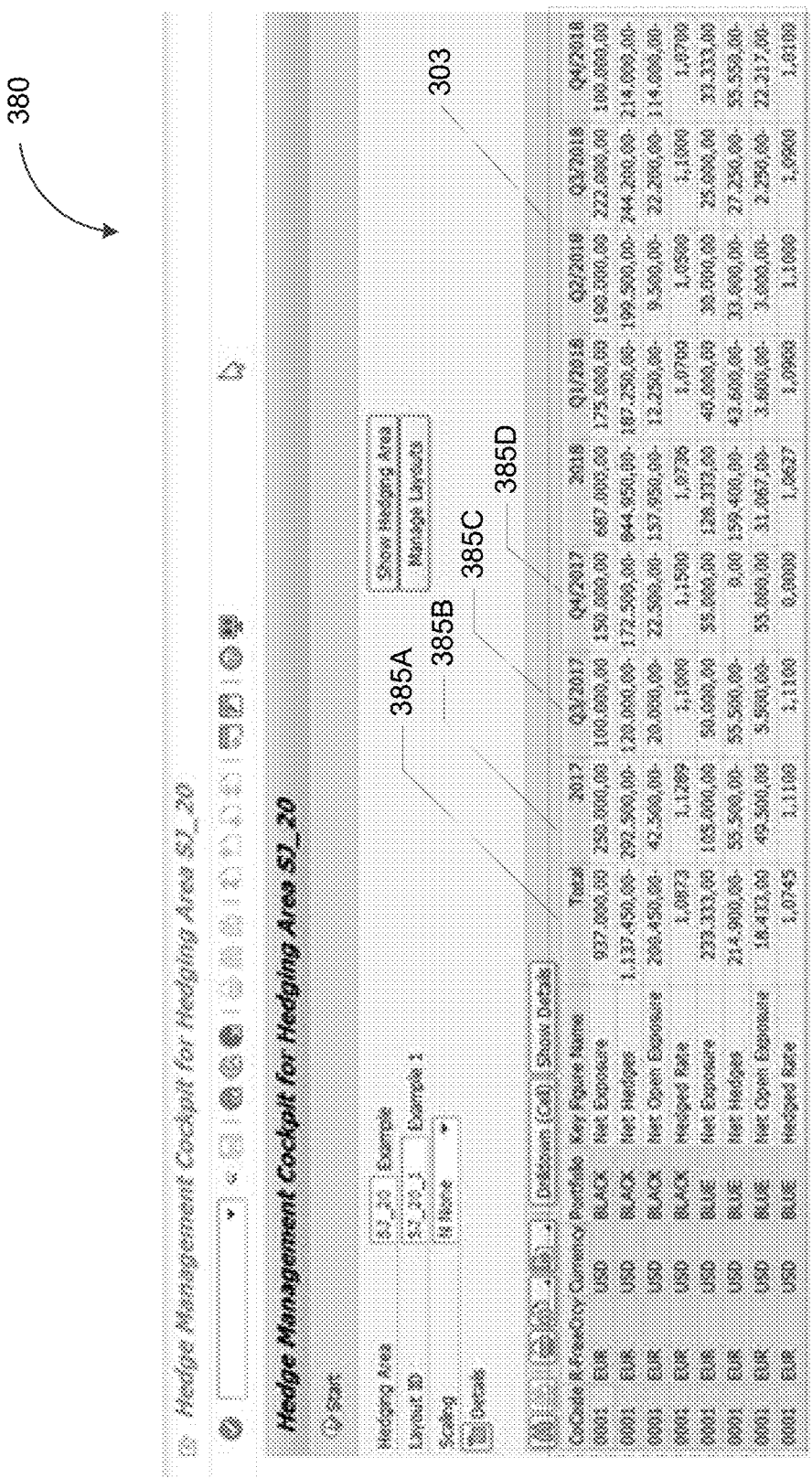
FIG. 3I depicts a user interface for displaying data, in accordance with some example embodiments.

Alternatively and/or additionally, the user 140 may designate the time dimension for a column-oriented display. To further illustrate, FIG. 3I depicts a user interface 380 for displaying data, in accordance with some example embodiments. The user interface 370 may show the table 303 in which individual columns correspond to the different timespans included in the time dimension. For example, a first column 385A may correspond to the inception to date (e.g., "total") timespan from the first display level. A second column 385B may correspond to the yearly timespan (e.g., "total of year") from the second display level. Furthermore, a third column 385C and a fourth column 385D may both correspond to the quarterly timespan (e.g., "periods") from the second display level.

Figure 4:
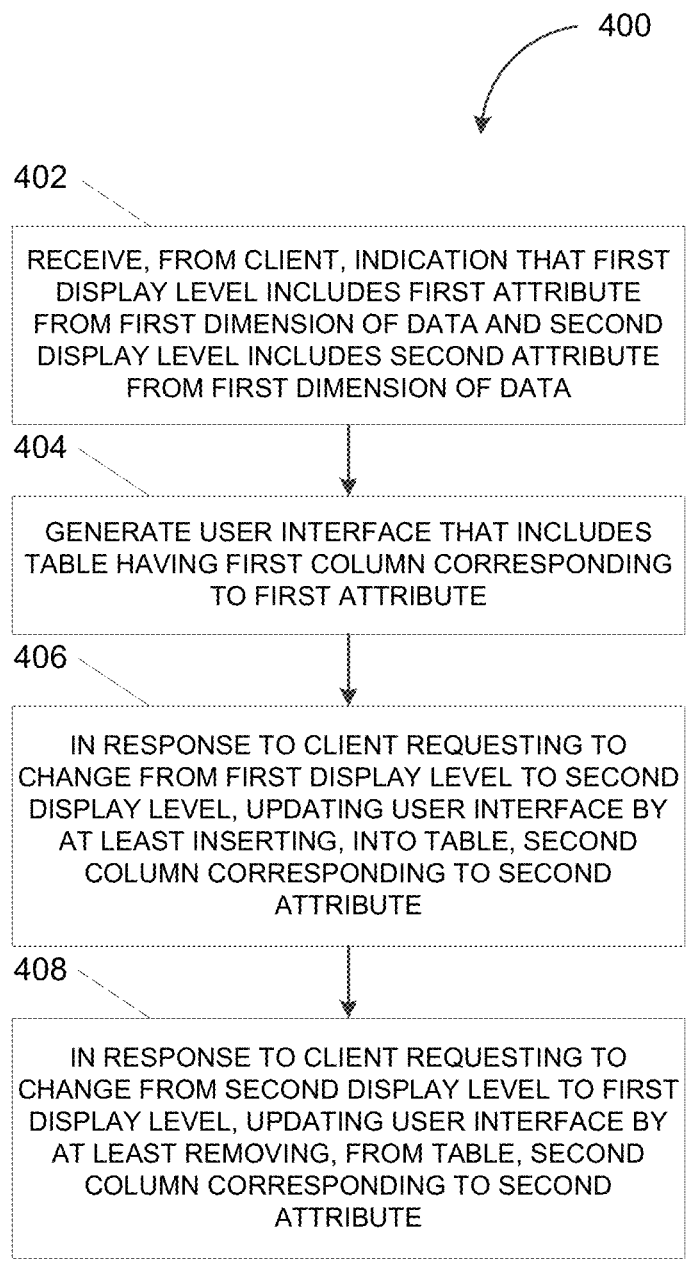
FIG. 4 depicts a flowchart illustrating a process for displaying data, in accordance with some example embodiments.

FIG. 4 depicts a flowchart illustrating a process 400 for displaying data, in accordance with some example embodiments. Referring to FIGS. 1-4, the process 400 may be performed by the database management system 100, for example, by the layout controller 112. For instance, the database management system 100 may perform the process 400 in order to display at least a portion of data retrieved from the database 115.

At 402, the database management system 100 may receive, from the client 120, an indication that a first display level includes a first attribute from a first dimension of data and that a second display level includes a second attribute from a second dimension of data. For example, as shown in FIGS. 2A-C, the user 140 may provide layout configurations via the user interface 200, the user interface 210, and/or the user interface 220 displayed at the client 120. As noted, each data dimension such as, for example, the differentiation criteria dimension, the keyfigure dimension, and/or the time dimension may be associated with a plurality of attributes. The user 140 may provide layout configurations that assign at least some of this plurality of attributes to different display levels. For instance, as shown in FIG. 2A, the differentiation criteria "company code," "risk-free currency," and "currency" may be assigned to a first display level while the differentiation criterion "portfolio" may be assigned to a second display level. Meanwhile, as shown in FIG. 2B, the keyfigure "net open exposure" may be assigned to the first display level while the keyfigures "hedged rate," "net hedges," and "net exposure" may be assigned to the second display level. Furthermore, as shown in FIG. 2C, the timespan from inception to date (e.g., "total") may be assigned to the first display level while the yearly timespan (e.g., "total of year") and the quarterly timespan (e.g., "periods") may be assigned of the second display level.

At 404, the database management system 100 may generate a user interface that includes a table having a first column of data corresponding to the first attribute. For example, referring to FIG. 3A, the database management system 100 may generate the user interface 300, which may be displayed at the client 120. The user interface 300 may include the table 303 having columns that correspond to attributes that have been assigned to the first display level. For instance, the table 303 may include the first column 305A corresponding to the differentiation criterion "company code," the second column 305B corresponding to the differentiation criterion "risk-free currency," and the third column 305C corresponding to the differentiation criterion "currency." Furthermore, the table 303 may include the fifth column 305E corresponding to the keyfigure "net open exposure," which have been determined based on data entries spanning the timespan from inception to date (e.g., "total"). The name of the timespan (e.g., "total") may be shown in the fourth column 305D of the table 303.

At 406, in response to the client 120 requesting to change from the first display level to the second display level, the database management system 100 may update the user interface by at least inserting, into the table, a second column of data corresponding to the second attribute. For example, as shown in FIGS. 3B-G, the user 140 may dynamically adjust the selection of data that is presented by changing the display level from the first display level to the second display level. The database management system 100 may respond to this change from the first display level to the second display level by inserting, into the table 303, columns and/or rows corresponding to one or more attributes assigned to the second display level. For instance, the database management system 100 may insert, into the table 303, columns and/or rows corresponding to the differentiation criterion "portfolio," the keyfigure "hedged rate," the keyfigure "net hedges," the keyfigure "net exposure," the yearly timespan (e.g., "total of year"), and/or the quarterly timespan (e.g., "periods").

At 408, in response to the client 120 requesting to change from the second display level to the first display level, the database management system 100 may update the user interface by at least removing, from the table, the second column of data corresponding to the second attribute. In some example embodiments, the user 140 may further dynamically adjust the selection of data that is presented by changing the display level from the second display level to the first display level. The database management system 100 may respond to this change from the second display level to the first display level by removing, from the table 303, columns and/or rows corresponding to the one or more attributes assigned of the second display level. For instance, the database management system 100 may remove, from the table 303, columns and/or rows corresponding to the differentiation criterion "portfolio," the keyfigure "hedged rate," the keyfigure "net hedges," the keyfigure "net exposure," the yearly timespan (e.g., "total of year"), and/or the quarterly timespan (e.g., "periods").

Figure 5:
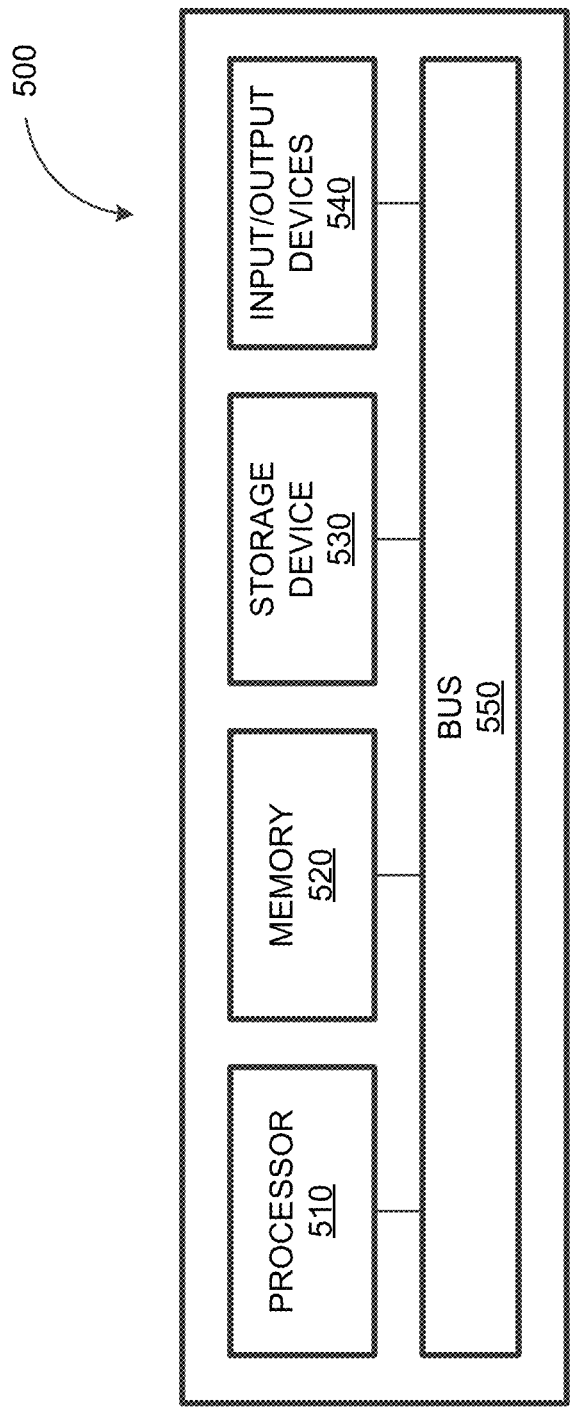
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database system 100, the multitenant database system 200, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the database system 100 and/or the multitenant database system 200. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   receiving, from a client device, a specification of one or more display levels, each display level of the one or more display levels corresponding to a selection of data from a database that is presented in a user interface, the specification including a first indication to assign, to a first display level, a first differentiation criterion from a differentiation criteria dimension and a first keyfigure from a keyfigure dimension, the specification further including a second indication to assign, to a second display level, a second differentiation criterion from the differentiation criteria dimension and a second keyfigure from the keyfigure dimension, the differentiation criteria dimension including a plurality of differentiation criteria for differentiation between a first data entry from a second data entry stored in the database, the keyfigure dimension including a plurality of keyfigures generated by at least applying an aggregation function to one or more data entries stored in the database, the specification assigning, to the first display level, a first timespan from a time dimension covered by a first plurality of data entries used to generate the first differentiation criterion and/or the first keyfigure, and the specification assigning, to the second display level, a second timespan from the time dimension covered by a second plurality of data entries used to generate the second differentiation criterion and/or the second keyfigure;

generating, based at least on a third indication from the client device selecting the first display level but not the second display level, the user interface for displaying, at the client device, a table having a first column corresponding to the first differentiation criterion and a second column corresponding to the first keyfigure but not a third column corresponding to the second differentiation criterion or a fourth column corresponding to the second keyfigure, the table further including a first plurality of rows occupied by a first plurality of values associated with the first differentiation criterion and the first keyfigure from the first timespan but not a second plurality of rows occupied by a second plurality of values associated with the first differentiation criterion and the first keyfigure from the second timespan;

in response to the client device requesting to change from the first display level to the second display level, updating the user interface by at least inserting, into the table, the third column corresponding to the second differentiation criterion, the fourth column corresponding to the second keyfigure, and the second plurality of rows corresponding to the second timespan; and in response to the client device requesting to change from the second display level to the first display level, updating the user interface by at least removing, from the first table, the third column corresponding to the second differentiation criterion, the fourth column corresponding to the second keyfigure, and the second plurality of rows corresponding to the second timespan.

2. The system of claim 1, wherein the table is further updated by inserting or removing at least a fifth column corresponding to the second timespan.

3. The system of claim 1, further comprising:
executing one or more database queries to retrieve, from the database, at least the portion of data.

4. The system of claim 1, further comprising:
receiving, from the client device, a request to change from the first display level to the second display level, the request including a selection of the first differentiation criterion and/or the first keyfigure.

5. A computer-implemented method, comprising:
receiving, from a client device, a specification of one or more display levels, each display level of the one or more display levels corresponding to a selection of data from a database that is presented in a user interface, the specification including a first indication to assign, to a first display level, a first differentiation criterion from a differentiation criteria dimension and a first keyfigure from a keyfigure dimension, the specification further including a second indication to assign, to a second display level, a second differentiation criterion from the differentiation criteria dimension and a second keyfigure from the keyfigure dimension, the differentiation criteria dimension including a plurality of differentiation criteria for differentiation between a first data entry from a second data entry stored in the database, the keyfigure dimension including a plurality of keyfigures generated by at least applying an aggregation function to one or more data entries stored in the database, the specification assigning, to the first display level, a first timespan from a time dimension covered by a first plurality of data entries used to generate the first differentiation criterion and/or the first keyfigure, and the specification assigning, to the second display level, a second timespan from the time dimension covered by a second plurality of data entries used to generate the second differentiation criterion and/or the second keyfigure;

generating, based at least on a third indication from the client device selecting the first display level but not the second display level, the user interface for displaying, at the client device, a table having a first column corresponding to the first differentiation criterion and a second column corresponding to the first keyfigure but not a third column corresponding to the second differentiation criterion or a fourth column corresponding to the second keyfigure, the table further including a first plurality of rows occupied by a first plurality of values associated with the first differentiation criterion and the first keyfigure from the first timespan but not a second plurality of rows occupied by a second plurality of values associated with the first differentiation criterion and the first keyfigure from the second timespan;

in response to the client device requesting to change from the first display level to the second display level, updating the user interface by at least inserting, into the table, the third column corresponding to the second differentiation criterion, the fourth column corresponding to the second keyfigure, and the second plurality of rows corresponding to the second timespan; and in response to the client device requesting to change from the second display level to the first display level, updating the user interface by at least removing, from the first table, the third column corresponding to the second differentiation criterion, the fourth column corresponding to the second keyfigure, and the second plurality of rows corresponding to the second timespan.

6. The method of claim 5, wherein the table is updated to include at least one column and/or at least one row corresponding to the time dimension.

7. The method of claim 5, further comprising:
executing one or more database queries to retrieve, from the database, at least the portion of data.

8. The method of claim 5, further comprising:
receiving, from the client device, a request to change from the first display level to the second display level, the request including a selection of the first differentiation criterion and/or the first keyfigure.

9. A non-transitory computer medium including program code, which when executed by at least on data processor, cause operations comprising:
receiving, from a client device, a specification of one or more display levels, each display level of the one or more display levels corresponding to a selection of data from a database that is presented in a user interface, the specification including a first indication to assign, to a first display level, a first differentiation criterion from a differentiation criteria dimension and a first keyfigure from a keyfigure dimension, the specification further including a second indication to assign, to a second display level, a second differentiation criterion from the differentiation criteria dimension and a second keyfigure from the keyfigure dimension, the differentiation criteria dimension including a plurality of differentiation criteria for differentiation between a first data entry from a second data entry stored in the database, the keyfigure dimension including a plurality of keyfigures generated by at least applying an aggregation function to one or more data entries stored in the database, the specification assigning, to the first display level, a first timespan from a time dimension covered by a first plurality of data entries used to generate the first differentiation criterion and/or the first keyfigure, and the specification assigning, to the second display level, a second timespan from the time dimension covered by a second plurality of data entries used to generate the second differentiation criterion and/or the second keyfigure;

generating, based at least on a third indication from the client device selecting the first display level but not the second display level, the user interface for displaying, at the client device, a table having a first column corresponding to the first differentiation criterion and a second column corresponding to the first keyfigure but not a third column corresponding to the second differentiation criterion or a fourth column corresponding to the second keyfigure, the table further including a first plurality of rows occupied by a first plurality of values associated with the first differentiation criterion and the first keyfigure from the first timespan but not a second plurality of rows occupied by a second plurality of values associated with the first differentiation criterion and the first keyfigure from the second timespan;

in response to the client device requesting to change from the first display level to the second display level, updating the user interface by at least inserting, into the table, the third column corresponding to the second differentiation criterion, the fourth column corresponding to the second keyfigure, and the second plurality of rows corresponding to the second timespan; and in response to the client device requesting to change from the second display level to the first display level, updating the user interface by at least removing, from the first table, third column corresponding to the second differentiation criterion, the fourth column corresponding to the second keyfigure, and the second plurality of rows corresponding to the second timespan.

* * * * *